United States Patent
Lowell

[19]

[11] Patent Number: 6,012,086

[45] Date of Patent: Jan. 4, 2000

[54] INTERNET EVENT TIMER RECORDING FOR VIDEO AND/OR AUDIO

[75] Inventor: Richard W. Lowell, Ramona, Calif.

[73] Assignees: Sony Corporation, Tokyo, Japan; Sony Electronics, Inc., Park Ridge, N.J.

[21] Appl. No.: 08/881,052

[22] Filed: Jun. 24, 1997

[51] Int. Cl.[7] .............................. G06F 13/38; G06F 15/17
[52] U.S. Cl. .......................................... 709/218; 709/231
[58] Field of Search ...................... 395/200.48; 348/906, 348/10; 386/83; 709/218, 219, 231; 455/6.2, 6.3

[56] References Cited

U.S. PATENT DOCUMENTS

| | | | |
|---|---|---|---|
| 5,293,357 | 3/1994 | Hallenbeck | 348/734 |
| 5,515,173 | 5/1996 | Mankovitz et al. | 358/335 |
| 5,543,933 | 8/1996 | Kang et al. | 358/335 |
| 5,737,477 | 4/1998 | Tsutumi | 386/83 |
| 5,828,417 | 10/1998 | Itagaki et al. | 348/553 |
| 5,845,290 | 12/1998 | Yoshii | 707/104 |

OTHER PUBLICATIONS

IDG Books, Internet and World Wide Web Simplified (2nd ed.), pp. 38–39, 1997.
Preston Gralla, How Intranets Work, pp. 193, 195, 1996.

*Primary Examiner*—Mark H. Rinehart
*Attorney, Agent, or Firm*—Blakely, Sokoloff, Taylor & Zafman LLP

[57] ABSTRACT

A system for automatically recording an event transmitted over a network is provided. A network client is programmed to automatically access a network server at a first specified time, download data from the server to a specified destination device or file, stop the download at a second specified time, and automatically disconnect from the network server. The network client is further programmed to execute additional command sequences required to access the data, and execute diagnostic routines in case of transmission error.

22 Claims, 6 Drawing Sheets

MULTIPLE INTERNET EVENT RECORDER

EVENT 1
- SOURCE URL
- DATE
- START TIME
- STOP TIME
- OPTIONAL MACRO (502)
- DESTINATION

EVENT 2
- SOURCE URL
- DATE
- START TIME
- STOP TIME
- OPTIONAL MACRO
- DESTINATION

EVENT 3
- SOURCE URL
- DATE
- START TIME
- STOP TIME
- OPTIONAL MACRO
- DESTINATION

EVENT 4
- SOURCE URL
- DATE
- START TIME
- STOP TIME
- OPTIONAL MACRO
- DESTINATION

EVENT 5
- SOURCE URL
- DATE
- START TIME
- STOP TIME
- OPTIONAL MACRO
- DESTINATION

EVENT 6
- SOURCE URL
- DATE
- START TIME
- STOP TIME
- OPTIONAL MACRO
- DESTINATION

FIG. 5

INTERNET EVENT TIMER RECORDING FOR VIDEO AND/OR AUDIO

FIELD OF THE INVENTION

The present invention relates generally to the field of computer networks, and more particularly to recording events transmitted over the Internet.

BACKGROUND OF THE INVENTION

The Internet is increasingly being used to transmit audio, video or audio/visual data. One common example is the incorporation of a music video in a World-Wide Web page as a video clip. A video clip is a sequence of images intended to be displayed in rapid succession to show an animation or moving picture sequence, and may incorporate an audio channel, for the integration of both graphic and audio information. Files containing audio/visual content are usually stored on a network server and made available to network clients upon request. To view such a video clip over the Internet, a user typically boots a web browser and enters the URL (Uniform Resource Locator) for the server which is providing the video file. The user then downloads the file using a network protocol, such as the file transfer protocol (FTP) and then plays the video on the client computer using the appropriate application program.

Although much of the audio/visual data available on the Internet is stored on network servers in the form of files which may be downloaded by a user and played at any time, certain events or programs may only be available at a particular time from a particular server. One such event is an Internet 'webcast', which is an event recorded or videotaped at one location, and then transmitted over the Internet as a live broadcast to be displayed on a web page. Another example is the transmission of radio or television broadcasts over the Internet. Such events are often not stored on a server as perpetual files, but instead are simply transmitted over the network as they occur. Thus, a user has only a limited opportunity to view or listen to these events.

Present Internet access devices and web browser programs do not provide a means for automatically recording a simulcast or one-time program or event. In order to access such events, it is necessary for the user to log-in to the source web site and view or listen to the event at the specified time. There are times, of course, when it may be inconvenient or impossible for the user to manually access the event, in which case the user loses the opportunity to view or listen to the event.

It is thus desirable to provide a system for recording an event which is available over a network for only a limited time, thus allowing a replay of the event at a later time. It is further desirable to provide a mechanism for programming the automatic recording of the event, thus eliminating the need for a user to manually access the event and initiate the recording process.

SUMMARY OF THE INVENTION

The present invention discloses a method and apparatus for automatically accessing and recording events transmitted over a network. In a method of the invention, a network interface device is programmed to access a network server, initiate the downloading of data from the network server to a storage device at a programmed start time, stop the transfer of data at a programmed stop time, and disconnect from the network server. The data to be recorded may be transmitted as either a computer readable file or as a digital bitstream, depending on the format of the data on the server. On the client, the data may be transferred to a computer storage device, such as a hard disk, or it may be transferred to an analog recording device, such as a video cassette recorder.

In an embodiment of the present invention, an event recorder program is executed on the client computer and provides a dialog box for the entry of certain event recording parameters. These event recording parameters include the network address for the event server, the start and stop times of the recording session, and the descriptor for the target file or recording device which stores or records the downloaded data. The event recording parameters may also include a command sequence which may be required to access a recordable event on the server, and diagnostic routines for failure recovery. The event recording program performs the recording process by automatically logging in to the source server at the programmed start time, initiating the data transfer to the destination location and disconnecting from the source server at the programmed stop time.

Other features of the present invention will be apparent from the companying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

FIG. 5 illustrates a dialog box for programming event parameters for multiple events, according to one embodiment of the present invention.

DETAILED DESCRIPTION

A system for recording an audio/visual event transmitted over the Internet and accessed through a web browser is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

Hardware Overview

According to the present invention, client computer systems in a network request and receive files or data streams consisting of audio, visual, or audio/visual data. According to one embodiment, the steps of accessing, downloading, and manipulating the data, as well as other aspects of the present invention are implemented by a central processing unit (CPU) in a client computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the client computer from a storage device or from one or more other computer systems over a network connection. For example, a server computer may transmit a sequence of instructions to the client computer in response to a message transmitted to the server over a network by the client. As the client receives the instructions over the network connection, the client stores the instructions in memory. The client may store the instructions for later execution or execute the instructions as they arrive over the network connection. In some cases, the downloaded instructions may be directly supported by the CPU. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU. In other embodiments, hardwired circuitry may be used in place of, or in combination with, software instructions to implement the present invention. Thus, the present invention is not limited to any specific combination of hardware circuitry and software, nor to any particular source for the instructions executed by the client computer.

Figure 1:
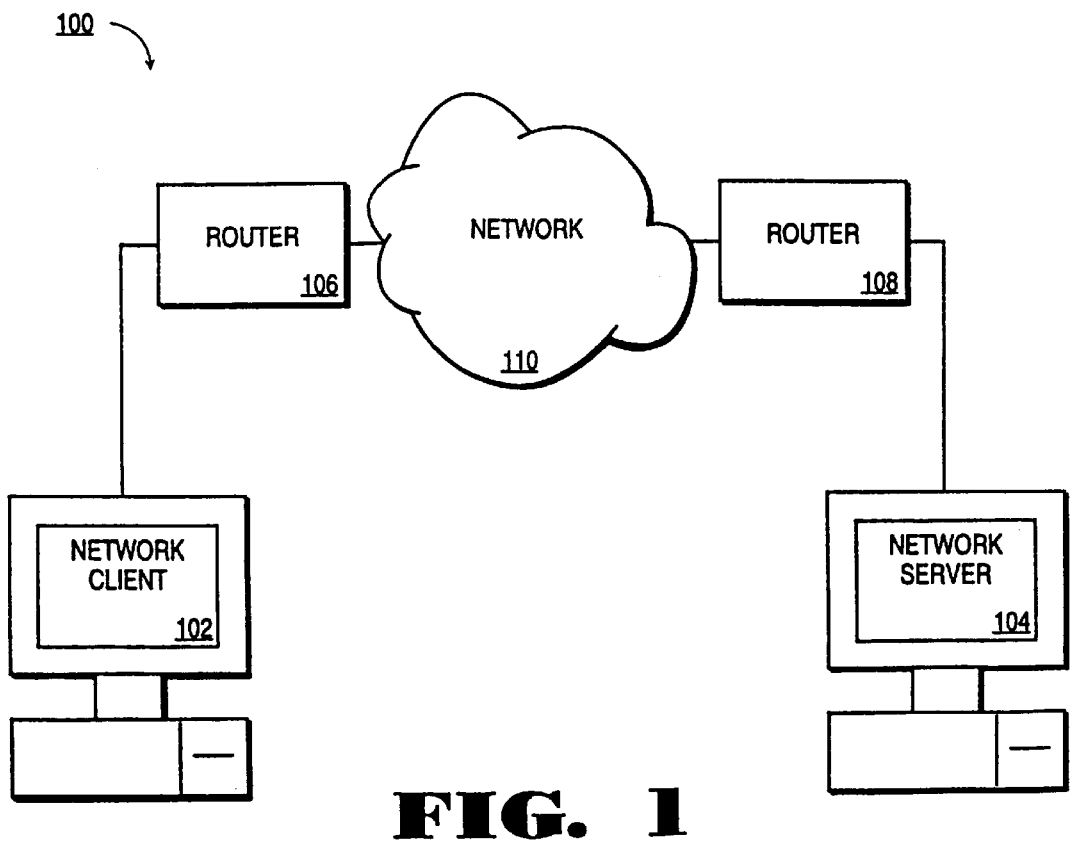
FIG. 1 illustrates a network including client/server computers transmitting and receiving data.

FIG. 1 illustrates a network 100 in which audio/visual data is transmitted between networked computers. Client computer 102 is coupled to a server computer 104 through network 110. The network interface between client 102 and server 104 may also include one or more routers, such as routers 106 and 108, which serve to buffer and route the data transmitted between client 102 and server 104. Network 110 may be the Internet, a Wide Area Network (WAN), a Local Area Network (LAN), or any combination thereof. Network server 104 contains application programs and/or data which are accessible over the network by other network stations, such as network client 102. In one embodiment of the present invention, network server 104 is a World-Wide Web (WWW) server which stores data in the form of 'web pages' and transmits these pages as Hypertext Markup Language (HTML) files over the Internet network 110 to network client 102. To access these files, network client 102 runs a 'web browser', which is simply an application program for accessing and providing links to web pages available on various Internet sites. In a typical Internet client-server environment, the client computer accesses the Internet through a single point of contact, commonly referred to as an Internet Service Provider (ISP) or on-line service provider.

Figure 2:
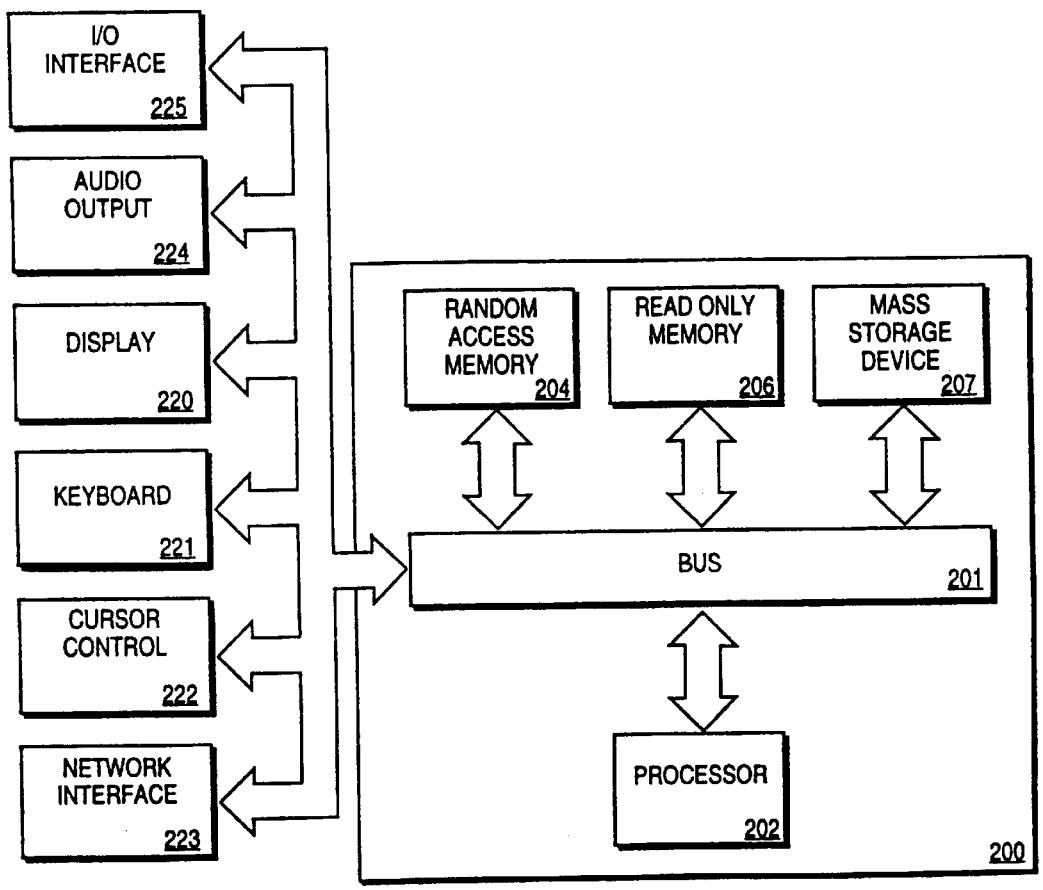
FIG. 2 is a block diagram of a client computer system which may be used to implement an embodiment of the present invention.

FIG. 2 illustrates a block diagram of a representative client computer such as network client 102 illustrated in network 100 of FIG. 1. The computer system 200 includes a processor 202 coupled through a bus 201 to a random access memory (RAM) 204, a read only memory (ROM) 206, and a mass storage device 207. Mass storage device 207 could be a disk or tape drive for storing data and instructions. A display device 220 for providing visual output is also coupled to processor 202 through bus 201. Keyboard 221 is coupled to bus 201 for communicating information and command selections to processor 202. Another type of user input device is cursor control unit 222, which may be a device such as a mouse or trackball, for communicating direction commands which control cursor movement on display 220. Also coupled to processor 202 through bus 201 is an audio output port 224 for connection to speakers which output the audio content produced by computer 200. Further coupled to processor 202 through bus 201 is an input/output (I/O) interface 225 which can be used to control and transfer data to electronic devices connected to computer 200, such as other computers, tape recorders, and the like.

Network interface device 223 is coupled to bus 201 and provides a physical and logical connection between computer system 200 and the network medium. Depending on the network environment in which computer 200 is used, this connection is typically to a network router, but can also be directly to another computer. Note that the architecture of FIG. 2 is provided only for purposes of illustration, and that a client computer used in conjunction with the present invention is not limited to this specific architecture.

In one embodiment of the present invention, network client 102 is a personal computer which interfaces to network 110 through a modem, or similar network interface device. In an alternative embodiment the network client 102 represented by computer system 200 may be a dedicated Internet access product, such as a Network Computer (NC), or a dedicated WorldWide Web client such as the WebTV™ system developed by WebTV Networks, Inc.

Internet Events

Popular application programs, such as web browsers, which display audio/visual sequences transmitted over the Internet allow a user to easily capture and view or listen to the transmitted data. Present programs, however, do not provide mechanisms which allow unattended recording of the data on a data storage device.

The present invention includes a method for automatically accessing and recording audio/visual events which are available from a network server. The present invention may be used with data which represents only audio data (e.g., a sound recording), or only video data (e.g., a silent movie), or combined audio/visual data (e.g., a movie with sound). The present invention may also be used with any network, including the Internet, or the World-Wide Web portion of the Internet, or any local or wide area network (LAN/WAN). For purposes of explanation, however, the following description will focus on automatic recording of audio/visual events from the World-Wide Web and it will be appreciated that the invention is not limited to this use.

Many audio/visual sequences such as music videos or excerpts from movies or television shows are available on Internet sites by servers which maintain World-Wide Web pages. A server provides access to video clips stored in its memory through a web server program, and a client downloads and displays information from the network using a web browser program. Many web browsers also provide 'plug-ins' which are software components that extend a web browser's capabilities. Popular plug-ins include programs which facilitate the presentation of sophisticated data such as multimedia events. For example, the RealAudio plug-in for the popular Netscape Navigator web browser provides live and on-demand real-time audio, which allows web servers to deliver audio content from their sites, and web clients to playback the audio content on their sites. Another similar plug-in is StreamWorks, which provides playback capability of both audio and video on a web client. Some playback programs allow a client to directly access bitstreamed data as the data stream is received over the network, thus eliminating the need for a user to first download and then play a data file.

Figure 3:
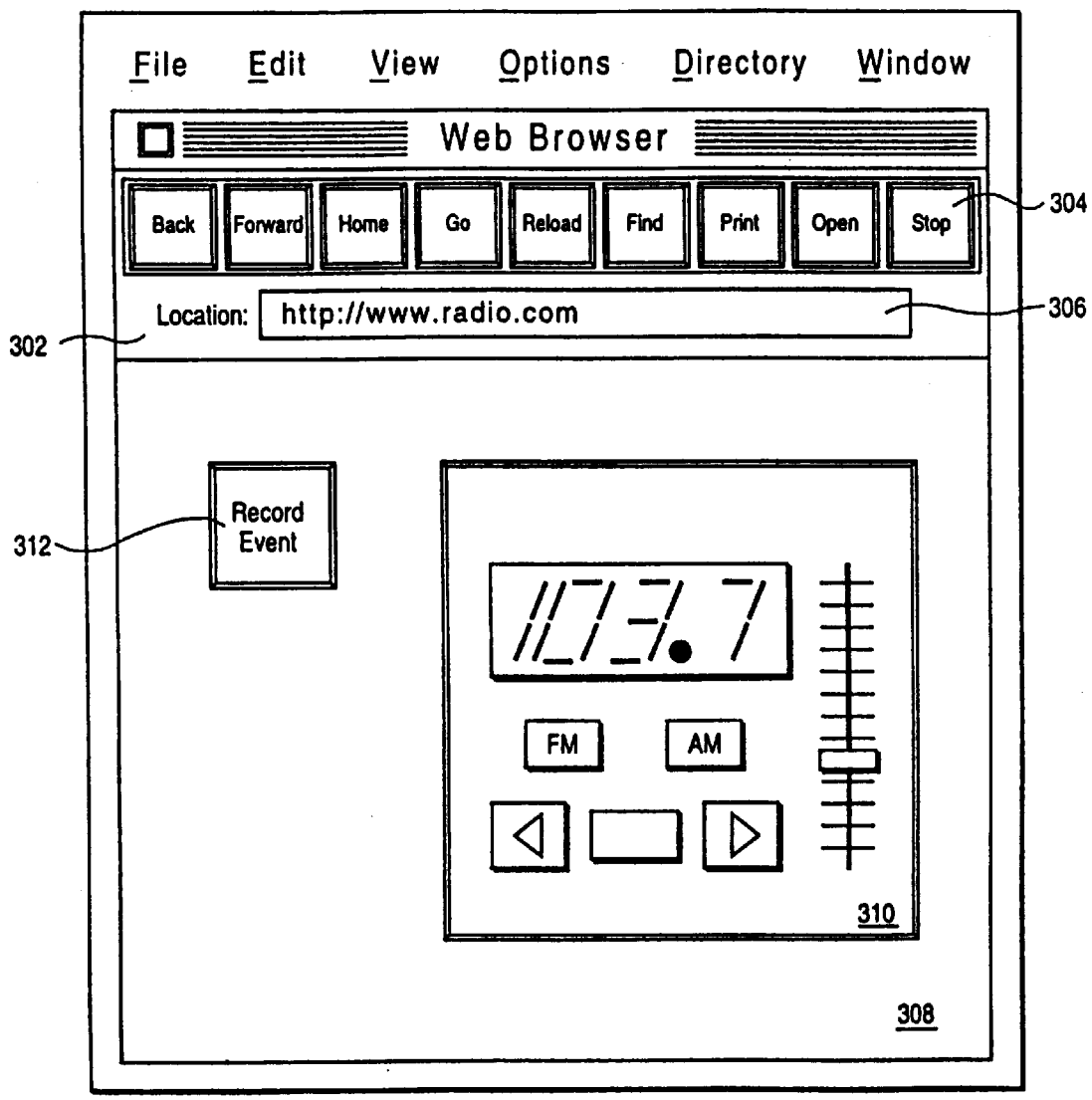
FIG. 3 illustrates a World-Wide Web page which provides access to programmed events transmitted over the Internet.

FIG. 3 illustrates a sample web page for a server which provides broadcast audio content. Screen display 300 illustrates the display of the web page as it appears when displayed by a web browser on a client computer, such as network client 102 in FIG. 1. Screen display 300 includes a web browser window 302 which contains several different fields. These fields include an option button field 304, a Uniform Resource Locator (URL) field 306, and web page 308. Web page 308 contains text and/or graphic information transmitted by the web site server specified in URL field 306.

Web page 308 may include a display window 310 for the display of a program or event. In the sample web page of FIG. 3, display window 310 includes a simulated radio control panel tuned to an on-line radio station. This control panel indicates that a user can listen to a live radio broadcast provided by the network server and transmitted to the network client over the Internet. Additionally, the live radio broadcast may be recorded immediately over a set duration or set up for future recording and subsequent playback. In order to adequately play back the radio broadcast, the client computer may need to execute the appropriate audio software (which may be a web browser plug-in).

Although FIG. 3 illustrates a server web page for an on-line radio application, it should be noted that FIG. 3 is meant to exemplify a web page which provides access to any type of multimedia content, such as a movie, video clip, or live transmitted event (a 'webcast'). In this case, the event might contain both audio and video data, and the web browser would need to execute the appropriate viewing software to display the program or event indicated in window 310.

In the above discussion, it is assumed that the event to be viewed or listened to is available simply at the location specified in URL field 306. That is, the event is stored at a location that is directly accessible to a client computer. In some cases, however, the event is not directly accessible at a particular web address. In these cases, the web address may only specify the server location, and further commands or options must be executed in order to play the video clip or audio program. For example, the program or event displayed in window 310 may be accessed within web page 308 by specifying a sub-address within URL field 306 or by selecting an additional hypertext link or option button displayed in web page 308. Similarly, some server sites might require that a user have an account or other payment means to access the site. In this case, the user might be required to enter a user ID or account password to access the site.

Recording an Internet Event

The network environment illustrated by FIG. 1 will be used to describe the method of the present invention. In network 100, server 104 stores an audio/visual sequence which will hereinafter be referred to as an Internet "event". Upon request by client 102, server 104 transmits the Internet event over network medium 110 for display on client 102. A typical event, such as a video clip, contains audio data representing a music or voice track, and a series of digital graphic images which form a video sequence. The web server 104 may transmit either or both components of the event in the form of self-contained executable data files or as digital bitstreams to the client. Web server 104 may also provide broadcast content over network 110. For example, server 104 may provide access to an Internet radio web site such as that illustrated in FIG. 3.

In one embodiment of the present invention, an automatic event recorder (hereinafter referred to as the "Internet event recorder") is available as a program which is executable by the computer operating system of the client computer, or the communication software of the network interface device which connects the client computer to the Internet. Upon execution, the Internet event recorder accesses and launches a web browser on the client to access the source site. If more than one web browser program is available on the client computer, the Internet event recorder may be programmed to select a specific web browser to be launched. According to one embodiment of the present invention, the Internet event recorder is programmed through a dialog box which is displayed on a display device connected to client computer 102. Depending on how it is implemented, the dialog box can be accessed by entering the program name on a command line, selecting the program name or command from a pull-down menu, or by selecting an onscreen option button.

In an alternative embodiment of the present invention, the Internet event recorder may be available as a plug-in program for a web browser running on a client computer, or as an extension to an existing web browser plug-in. In this case, the Internet event recorder may be invoked by selecting an option button on the web browser, if one is available.

Figure 4:
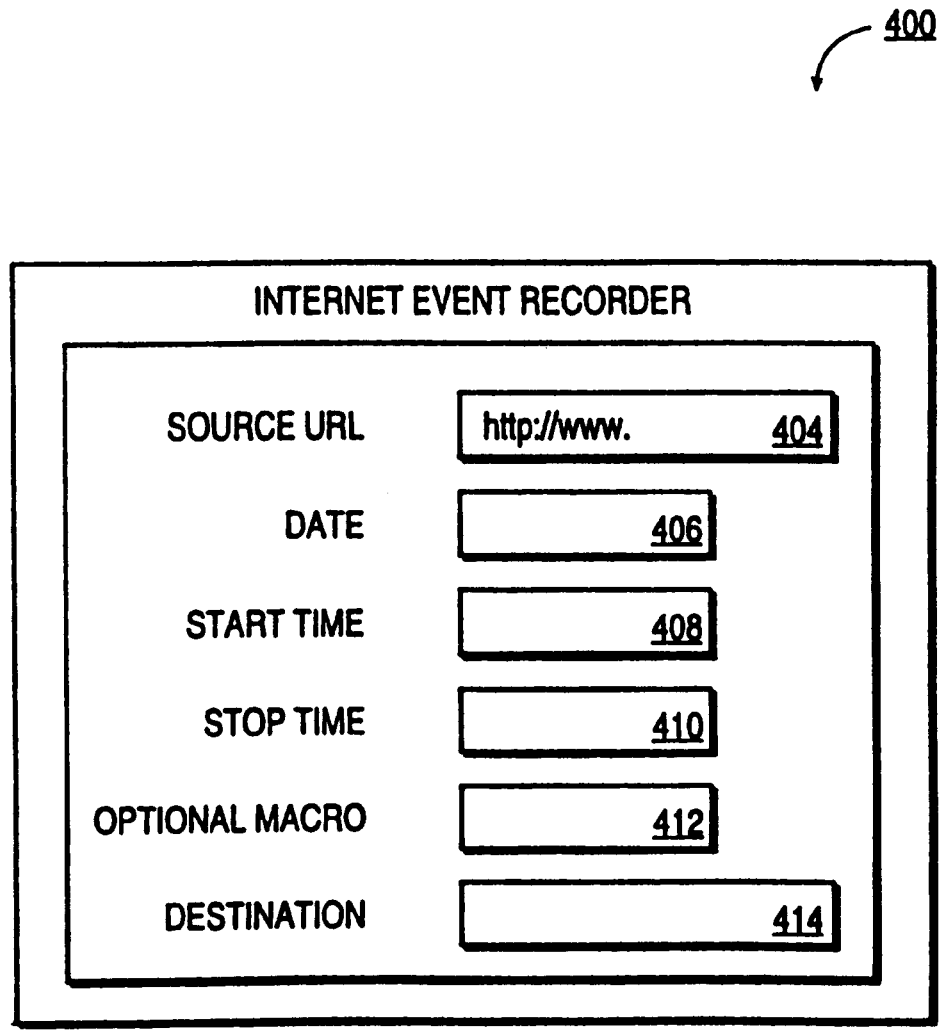
FIG. 4 illustrates a dialog box for programming event parameters for a single event, according to one embodiment of the present invention.

FIG. 4 illustrates a representative Internet event recorder dialog box. Internet event recorder dialog box 400 includes several fields which allow the input of data by the user through an input device. The first field 404 is the source URL field. In this field the user types the URL or Internet address for the web site of the server which is providing the data to be recorded. Field 406 is the date field in which the user types the date on which the event is to be recorded. The date may be specified as a single day if a single event is to be recorded; or the date may be specified as a range of dates (e.g., "1/1 to 1/5") or selected days (e.g., "every day" or "every Saturday") if a recurring event is to be recorded. In field 408, the user inputs the start time at which the recorder is to start recording, and in field 410 the user enters the stop time which is the time at which the recording is to be stopped. Alternatively, field 410 may be programmed with the duration of the recording session starting from the start time (e.g., +2 hours). The time parameters can be entered in standard 12-hour clock format with a.m. or p.m. indicators, or alternatively they can be entered in 24-hour format. Additional parameters which may be programmed into the time fields include an adjustment for time zone variations and automatic correction for daylight savings time (e.g., if the client and the server computers are located in different time zones).

Field 412 provides an entry field for an optional macro or program routine. A macro or command string may be required if access to the actual audio or video data to be recorded is not directly accessible from a URL specified in the source URL field, 404. For example, downloading or accessing an audio or video data stream might require the input of certain control keys, the entry of a network sub-address, or the entry of a user ID or access code (as in the case of a service which requires a payment account). Once the user has determined a particular key sequence or macro which must be performed to access data within a particular source or server web site, he may enter this sequence in macro field 412. Upon access to the source URL, the web browser will automatically perform the macro or command key sequence which has been entered into optional macro field 412. Thus, the event file or data stream can be accessed automatically in the manner which would be required if the user were performing that function manually.

Field 414 provides a field in which the user enters the destination for the data stream or data file. Typically the destination is the name of a file which has been created on a hard disk for storage of the data stream or file. Alternatively, however, destination field 414 can store a descriptor specifying an external device, such as a tape recorder, which is controlled by the client computer. In one embodiment of the present invention, the Internet event recorder may be configured to record the data stream or file to a default device, such as a hard disk. In this case, a destination field is not required since the recorded event will automatically write the data to the default device.

It should be noted that additional fields, other than those explicitly shown in FIG. 4 may be provided to extend the functionality of the Internet event recorder. For example, a retry field may be provided to specify the number of times to retry a source URL connection if the source server is busy, or an ISP if the ISP line is busy or a line drop occurs. Such a retry field may also be used to store an alternate source server URL or an alternate ISP telephone number, if such alternates are available. Similarly, a failure field may be included to provide an error message or execution of a diagnostic routine in the case of a failed or interrupted network connection. Another possible additional field, which may be included if the Internet event recorder is implemented as a stand-alone program, is a field which specifies the web browser to be launched to provide access to the source site. Such a field would allow the user to select a particular web browser if more than one web browser is available on the client computer.

In one embodiment of the present invention, more than one Internet event may be recorded by the Internet event recorder. In this case multiple entry windows may be provided in the record window of the Internet event recorder. FIG. 5 illustrates the Internet event recorder dialog window containing several individual event recording windows for programming the recording of several individual events. The dialog box of FIG. 5 allows the programming of recordings for multiple Internet events. These events could be available at different times and/or originate from different source web sites. Each dialog box, such as dialog box 502 for event 1, in the multiple event recorder window 500 is substantially equivalent to dialog box 400 illustrated in FIG. 4. FIG. 5 illustrates six such dialog boxes for the multiple event recorder 500. However, it will be appreciated that any number of dialog boxes may be provided for the recording of multiple events. Each individual dialog box within the multiple event recorder allows the user to input the source, date, start/stop times, macros, and destinations for each of the individual events, as explained above with respect to FIG. 4. In this case, a software routine is needed to prevent multiple programmed events from having the same scheduled recording period.

Figure 6:
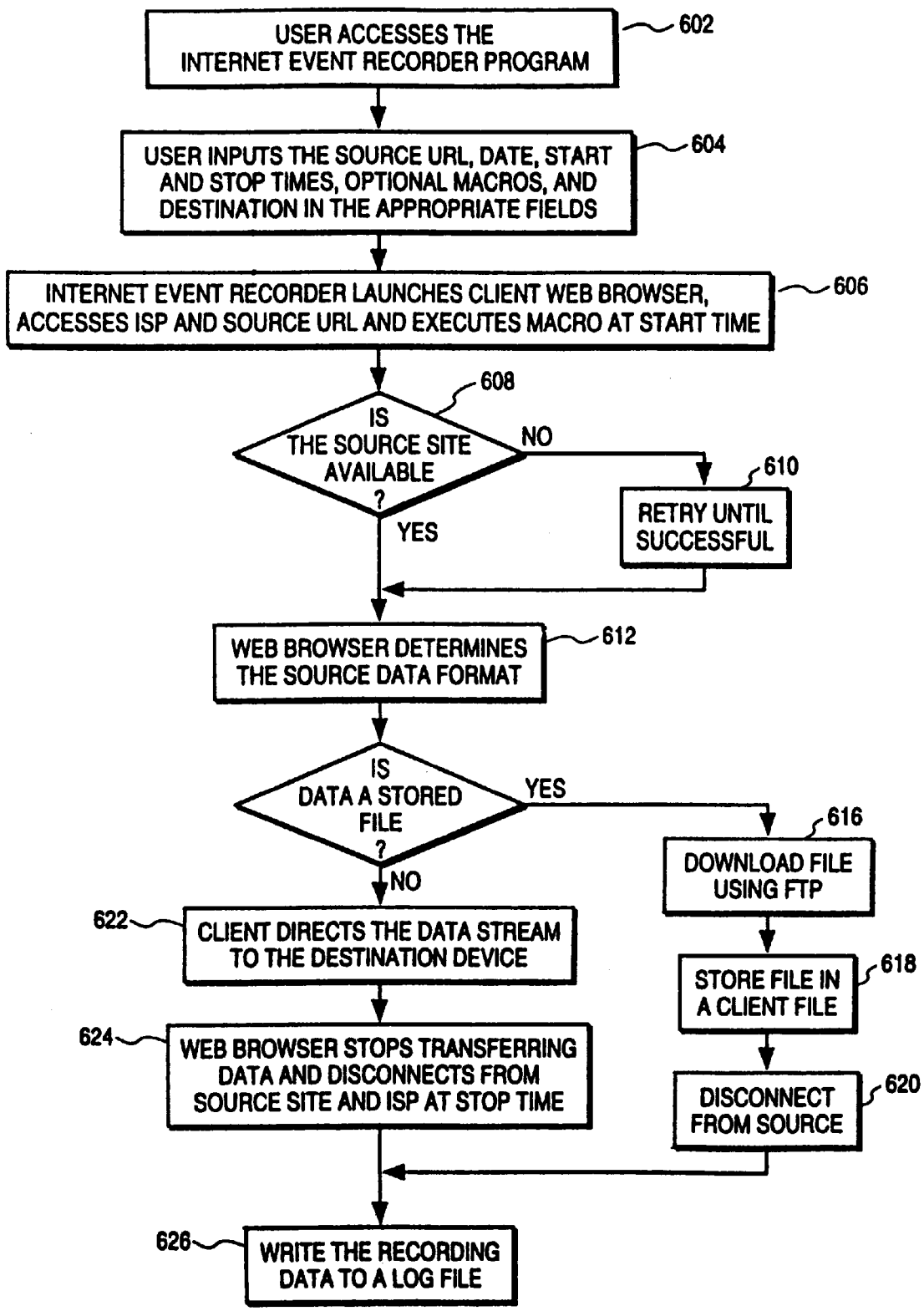
FIG. 6 is a flowchart illustrating the process of programming the recording of an Internet event according to one embodiment of the present invention.

FIG. 6 is a flow chart illustrating the process of recording a transmitted Internet event according to one embodiment of the present invention. In step 602, the user accesses the Internet event recorder program running on client computer 102. If the Internet event recorder is implemented as a stand-alone program, it is accessed and executed according to the conventions of the operating system software on the client computer. If the Internet event recorder is implemented as a web browser extension, however, it typically may be accessed by typing the appropriate location address in the URL field 306 of the web browser, or by selecting an appropriate hypertext link button (e.g., link button 312 in FIG. 3), depending on the conventions of the web browser being used.

In step 604 the user inputs the source URL, date, start and stop times, optional macro, and a destination descriptor in the appropriate fields of the dialog box, such as dialog box 400 illustrated in FIG. 4. A general control method on the client computer may be available to review or cancel scheduled recordings, and to turn on or off the timer record mode, without requiring the user to bring up a web browser. At this point, user interaction with the event recorder ends, and the Internet event recorder automatically performs the recording functions.

On the date specified in field 406 and at the time specified in field 408, the Internet event recorder commences a recording session. In step 606, the Internet event recorder launches the specified web browser and dials up the Internet Service Provider. Once a network connection has been established, the Internet event recorder accesses the source URL specified in field 404 through the web browser, and executes any required macro. The macro to be executed is the key sequence or program stored in field 412 of dialog box 400. It may occasionally occur that an ISP or source web site is unavailable, for example a source web site server may be busy or down at the time specified by the start time, or the source web site may have been moved. If the ISP or source web site is temporarily unavailable (such as if the telephone line to the server is busy) the web browser can be programmed to retry entry to the ISP or source site until access is successful, step 610. If, however, a source web site is permanently unavailable, such as if the server has been taken off-line or the web address has changed because the web site has moved, the Internet event recorder will return an error message to the web browser indicating that a recording was not possible because of unavailability of the server web site. If an alternate ISP number or source URL has been provided, the alternate will be attempted before an error message is returned.

If the web site (or an alternate) is available, as determined in step 608 either upon an initial access attempt or a retried access attempt, the web server next determines the format of the source data, step 612. Audio or video data may be made available by a server in several different forms. A common method is to simply store the data in memory as a data file. Such a file could contain the data to be transmitted in either standard data form or in compressed and/or encrypted form. The data on the web server could also be stored in a format which allows packetized bitstream downloading. Thus, in step 612 the web browser will determine the format in which the data is available. If in step 614 it is determined that the data is stored in a file, the Internet event recorder will commence downloading the file using the appropriate network protocol, such as the file transfer protocol (FTP), step 616. The downloaded file will then be stored in a client file on a storage device such as a hard drive within or connected to the client computer, step 618. After the download and storage process is complete, the Internet event recorder will then cause the web browser to disconnect from the source and the client computer to disconnect from the ISP, step 620.

If it is determined in step 614 that the data is in the form of a digital bitstream which is simply provided or transmitted through the web server to be downloaded upon access by a client, the Internet event recorder will receive the data and direct the bitstream or signal to the destination device specified in field 414 of the Internet event recorder dialog box 400. The Internet event recorder will continue to receive and direct the data stream to the appropriate destination device until the stop time (or duration) specified in field 410 of Internet event recorder dialog box 400 is reached, step 622. At the time specified by the stop time or the limit of the specified recording duration, the Internet event recorder will stop downloading the data and cause the web browser to automatically disconnect from the source web site, step 624. If no further Internet access is needed immediately, the client computer will then also disconnect from the ISP.

Upon disconnection from the source web site, a data log file associated with the recorded data event is stored in the appropriate memory device of the client computer 200 (e.g., mass storage device 207 or RAM 204), step 626. Such a log file allows the user to review recorded event information. The logged recording data could include the address of the source URL, the date of the recording and the start and stop times, the destination descriptor or file name, as well as any other data that might be available and beneficial to the user.

In one embodiment of the present invention, the destination of the event data will be a file stored on a storage device within or connected to the client computer. This will often be the case if the data to be recorded is a computer file downloaded through FTP, or a digital bitstream transmitted over the network. In this case, the destination will typically be a hard disk drive, such mass storage device 207 in client computer 200, and the file name will be entered in field 414 of FIG. 4.

If, however, the program is to be recorded to an external recording device rather than on a computer disk, the destination may be an analog or digital record and play back device. For example, for an audio signal, the destination may be an analog tape recorder or DAT (Digital Audio Tape) machine; and for a video signal, the destination may be a video cassette recorder (VCR). It is assumed that the appropriate recording device is connected to and controlled by the client computer through an appropriate interface, such as I/O interface 225. In the case of an analog recording device, it is further assumed that the digital signal received over the network is converted to an analog signal prior to output through the I/O interface 225. In this case, the program being recorded is the actual program data as played or as would be available on the client computer if the user were present at the time of the transmission.

In the case where the destination is a file stored on a hard disk drive, the user will access the file at a later time convenient to the user. In order to access and play back the data, it is typically necessary for the user to execute the same programs or plug-ins that are required when accessing the data from the server directly. Such plug-ins could include decryption and decompression programs. For example, if the data to be accessed is a video file which was compressed using the MPEG compression standard, the web browser would need to run an MPEG decompression plug-in in order to allow the user to view the program. Similarly, if the MPEG compressed data were transferred from the server through the recorder onto a file stored on a hard drive, upon subsequent playback of the file, the user would need to execute the MPEG decompression program to view the data as a video sequence.

In an alternative embodiment, the present invention may be designed to be configured by the user to access available scheduled programs through automatic "program guides" to the extent that such program guides are available through various Internet source sites. Such program guides could consist of codes which represent the location and time availability of particular Internet programs or events, and could be published or made available on-line from various Internet content providers. In this case, dialog box 400 could contain a single field for the program guide code instead of separate fields for the source URL, date, and start and stop times, or the entry fields could be automatically entered by simply making the desired program guide selection.

Recording an Internet event as described in the present disclosure provides not only for time-shifted viewing, but also allows a user to manipulate the data contained in the event. For example, to the extent allowed by the originator, the user may edit or caption a particular audio or video segment, or transform the format for reproduction in an alternate medium.

Internet Event Recorder Screen Authoring

In one embodiment of the present invention, the Internet Event Recorder screen and associated dialog boxes are created using standard HTML command structures. Option buttons and data entry fields may also be produced by constructing HTML objects and program links. Various different page formats may be utilized to achieve the present invention.

According to another embodiment, the Internet Event Recorder screen and associated dialog boxes could be produced using bit-mapped images or standard graphic format images, and displayed on a display device through a network interface, or over a broadcast signal. In such embodiments these screens need not be web pages accessed from the World-Wide Web using a web browser, but instead could be images of the type normally created, transmitted and displayed within the system in which the display device is typically used, such as a Local Area Network for a computer display.

In yet another embodiment, the Internet Event Recorder screen could be programmed into the display device as a built-in feature and accessed through a dedicated control button or on-screen menu, such as with the display controls for a television.

In the foregoing, a system has been described for automatically recording an audio/visual sequence transmitted over the Internet for display on a client computer. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for automatically storing data transmitted during a specified date and time of a limited duration over a network in a client system in communication with at least one source server, the method comprising the steps of:

providing one or more text entry fields for the entry of a source address, a date parameter, a first time parameter, and a second time parameter, said date parameter and first time parameter corresponding to the specified date and time the data is available over the network;

establishing a network connection between the client system and the source server;

accessing the source server specified by the source address, and downloading a data stream from the source server on the date specified by the date parameter and at the time specified by the first time parameter;

storing the data in a device coupled to said client system; and stopping the downloading of the data stream at the time specified by the second time parameter.

2. A method according to claim 1 further comprising the step of disconnecting the network connection from the source server subsequent to the time specified by the second time parameter.

3. A method according to claim 1, wherein the network is the Internet and the step of establishing a network connection includes the step of accessing an Internet Service Provider network server coupled to the client computer, and.

4. A method according to claim 1 further comprising the step of providing a destination text entry field for the entry of a destination descriptor, wherein the data stream is stored in the device specified by the destination descriptor.

5. A method according to claim 1 further comprising the step of providing a command field for entry of a command sequence specifying commands or user information required to access the data stream from the source server.

6. A method according to claim 3 wherein the date, the first time parameter, and the source address are specified in a program guide code, the program guide code providing a mechanism for automatically accessing the source of a program to be recorded at the time and date on which the program is available.

7. A method according to claim 4 wherein the destination descriptor specifies a file in a memory coupled to the client system.

8. A method according to claim 4 wherein the destination descriptor specifies an electronic recording device coupled to the client system.

9. A method according to claim 1 wherein the one or more text entry fields are contained within a text entry area displayed on a display device coupled to the client system, and the text entry area is a graphic image stored in a memory coupled to the client computer.

10. A method according to claim 3 wherein the one or more text entry fields are contained within a text entry area displayed on a display device coupled to the client system, and the text entry area is provided through an interactive display environment including World-Wide Web content, and the control screen and text entry areas are hypertext markup language (HTML) objects, and the method further comprises the step of executing a web browser program on the client computer.

11. An apparatus for automatically storing data transmitted over a network in a client system, said data available on a specified date and during a specified time of a limited duration, said client system in communication with at least one remote server system, the apparatus comprising:

means for providing a source field for entry of a source address;

means for providing a date field for entry of a date parameter of when the data is available:

means for providing a first time field for entry of a first time parameter, wherein the time entered in the first time field occurs during the day specified by the date parameter and when the data is available;

means for providing a second time field for entry of a second time parameter;

means for providing a destination field for entry of a destination descriptor; and means for processing the date parameter, the source address, the first time parameter, the second time parameter, and the destination descriptor entered into their respective fields, wherein the processing is operable to transfer a data stream available at an address specified in the source field to an address specified in the destination field during the time specified in the first time parameter and the second time parameter.

12. An apparatus according to claim 11 further comprising means for providing a command field for entry of one or more commands or user information parameters required to access the data stream provided by the source specified in the source field.

13. An apparatus according to claim 12 wherein the date field, the source field, the first time field, the second time field, and the destination field are provided in a text entry field displayed on a display device coupled to the client system.

14. An apparatus according to claim 13 wherein the text entry field is contained within a control screen displayed on the display device, and the control screen and text entry field are graphic images stored in a memory coupled to the client computer.

15. An apparatus according to claim 13 wherein the text entry field is contained within a control screen displayed through an interactive display environment including World-Wide Web content, and wherein the control screen and text entry field are hypertext markup language objects.

16. A computer comprising:

a processor;

an input/output circuit coupled to the processor;

a display device coupled to the processor;

a network interface device coupled to the processor, the network interface device capable of being coupled to a server computer through a network medium; and a memory coupled to the processor, the memory having contained therein sequences of instructions which, when executed by the processor, cause the processor to performn the steps of:

displaying a text entry field on the display device;

receiving a source address entered in the text entry field;

receiving a date parameter entered in the text entry field, said date parameter corresponding to when data is available at the source address, said data available during a specified time of a limited duration;

receiving a first time and a second time entered in the text entry field said first time corresponding to when data is available at the source address;

receiving a destination descriptor entered in the text entry field;

automatically accessing a source server specified by the source address by establishing a network connection over the network medium between the computer and the server computers and downloading a data stream from the source server at the first time;

storing the data in a device specified by the destination descriptor;

stopping the downloading of the data from the source server at the second time; and disconnecting from the source server subsequent to the second time.

17. A computer according to claim 16 wherein the memory further contains instructions which cause the processor to perform the step of receiving a command sequence entered in the text entry field.

18. A computer according to claim 16 wherein the network medium is part of the Internet and the memory further contains instructions which cause the processor to perform the steps of:

accessing an Internet Service Provider network server coupled to the computer prior to the step of accessing the source server, and disconnecting from the Internet Service Provider network server after disconnecting from the source server.

19. A computer according to claim 16 wherein the device specified by the destination descriptor is a storage device coupled to the processor.

20. A computer according to claim 16 wherein the device specified by the destination descriptor is an electronic recording device coupled to the processor through the input/output circuit.

21. A computer according to claim 16 wherein the text entry field is provided on a control screen through a display environment, and the control screen and text entry fields are graphics objects stored in a memory coupled to the processor.

22. A computer according to claim 18 wherein the text entry field is provided on a control screen through an interactive display environment including World-Wide Web content, and the control screen and text entry fields are hypertext markup language objects.

* * * * *

UNITED STATES PATENT AND TRADEMARK OFFICE
CERTIFICATE OF CORRECTION

PATENT NO.   : 6,012,086
DATED        : January 4, 2000
INVENTOR(S)  : Richard W. Lowell It is certified that error appears in the above-identified patent and that said Letters Patent is hereby corrected as shown below:

In column 2 at line 21 delete "companying" and insert --accompanying--

In column 10 at line 67 delete "computer, and." and insert --computer.--

In column 12 at line 29 delete "performn" and insert --perform--

Signed and Sealed this

Twenty-seventh Day of March, 2001

Attest:

NICHOLAS P. GODICI

Attesting Officer

Acting Director of the United States Patent and Trademark Office